Figure 1:
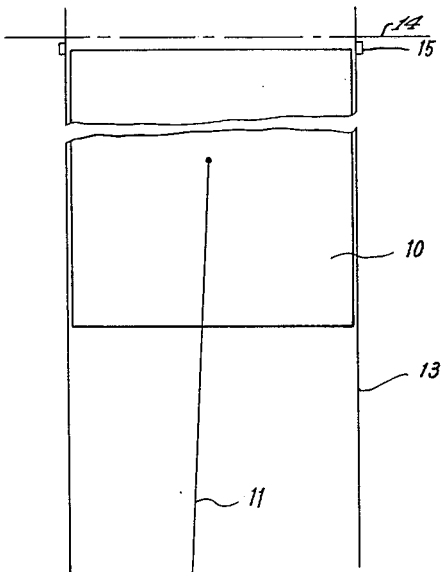

Dec. 21, 1965   M. BURCH FRANCH   3,224,426
INTERNAL COMBUSTION ENGINES
Filed May 12, 1964

INVENTOR.
Martin Burch Franch
BY
Wenderoth, Lind & Ponack
Attorneys

United States Patent Office 3,224,426
Patented Dec. 21, 1965

3,224,426
INTERNAL COMBUSTION ENGINES
Martin Burch Franch, 15 Republica Argentina Ave.,
Barcelona, Spain
Filed May 12, 1964, Ser. No. 367,609
Claims priority, application Spain, May 22, 1963, 288,265
4 Claims. (Cl. 123—191)

This invention relates to improvements applied to internal combustion engines.

There are known engines fitted with combustion lateral chambers which open during the course of the piston and are put in orderly communication with the principal combustion chamber in such a way as to afford chain combustions which keep pushing the piston during its course.

An object of the present invention is to substitute for those lateral chambers a slight grooving instead, built either in part or entirely around the cylinder wall, very near to top dead center, say at about 1 mm. The purpose of this is not to actually build a lateral combustion chamber because of the very small volume available which cannot hold any substantial amount of fuel mixture, and since it is placed just at the beginning of the course of the piston before the crank has turned 10°, it cannot actually be termed a lateral combustion chamber to be met with during the downward stroke of the piston.

The reason is that the groove is already in communication with the primary chamber immediately after the combustion process has commenced, and the groove is clearly in communication with the combustion chamber at the very time when the combustion flame process under way has not yet completely burnt the entire mixture, so that the grooving system described forms a part of a standard general type of combustion chamber.

The purpose of this grooving is to cause one most important duty, which is to provide for the building up of an extraordinary increase in volume to the initial volume of the combustion chamber, which volume being very small when compared with the total swept volume made by the piston after reaching bottom dead center, is however quite big when compared to the volume available in the initial chamber at the time the piston is at top dead center, so that when this volume is added to that of the combustion chamber at the very beginning of the downward course of the piston, a sudden loss of compression occurs to that portion of the mixture still to be burnt, resulting in a sudden pressure drop and preventing in any case any resulting "spontaneous combustion" through excess of compression, thus allowing reaching within the combustion chamber much higher initial compression ratios.

Also the eventual volume increase afforded by the groove actually reduces the prevailing precise conditions of pressure and temperature of the mixture almost at the beginning of the expansion stroke, that is, to a point below the maximum limit of the thermodynamical evolution of the gases.

In this manner the highest useful compression ratio is improved, or fuels of a higher knocking rating can be used without reaching that limit, and as a consequence less heat is produced at the beginning of the expansion stroke.

Thus it follows that the control of the expansion conditions of an engine at its beginning is of great importance, because in this manner the time involved for the completion of combustion is increased within the movement of the piston and the deflagration resulting from combustion is allowed to be longer.

Through these new operating conditions it is actually possible to operate an engine duly fitted with said grooving system to much higher compression and expansion ratios without reaching a critical knocking limit.

Figure 2:
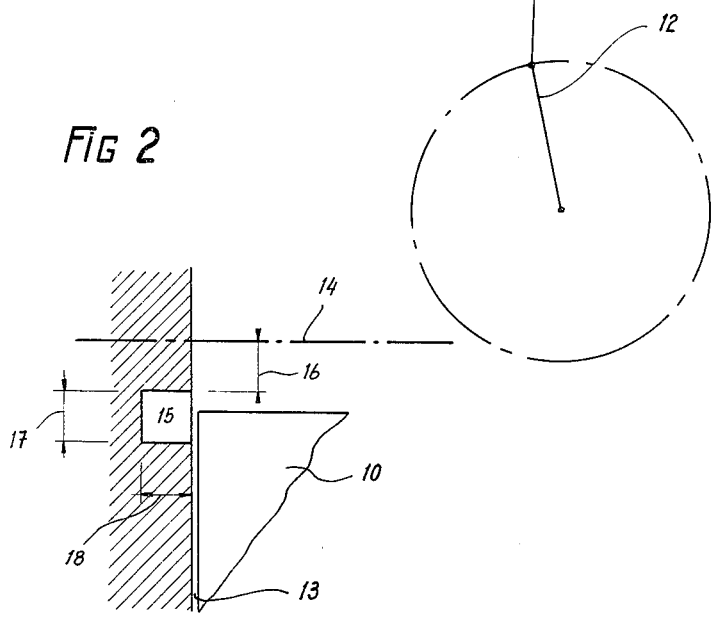

In the drawings:

FIGURE 1 is a schematical view of a motor, and
FIGURE 2 shows a detail thereof upon a larger scale.

Referring to the drawing, a piston is shown at 10 connected to a crank 12 by the connecting rod 11 and when the crank 12 is at an angle of 10° maximum from the vertical the groove 15 becomes visible in the cylinder 13 under the top dead center line 14.

What I claim is:

1. An improvement in an internal combustion engine comprising a piston, a cylinder defining a combustion chamber for said piston having a groove in the wall thereof adjacent top dead center as reached by said piston, said groove extending circumferentially the entire cross section of said wall of said cylinder and having a total volume smaller than that required for containing a fuel mixture capable of involving any further explosions within said combustion chamber, said groove being placed adjacent said top dead center so that it is actually in communication with the combustion chamber before the entire mixture has had time to burn throughout, this providing an increased volume to prevent self ignition.

2. An improvement in an internal combustion engine comprising a piston, a cylinder defining a combustion chamber for said piston having a groove in the wall thereof adjacent top dead center as reached by said piston, said groove extending circumferentially partially around the entire cross section of said wall of said cylinder and having a total volume smaller than that required for containing a fuel mixture capable of involving any further explosions within said combustion chamber, said groove being placed adjacent said top dead center so that it is actually in communication with the combustion chamber before the entire mixture has had time to burn throughout, thus providing an increased volume to prevent self ignition.

3. Improvement as set forth in claim 1 wherein said groove is located in said cylinder wall in a zone covered by said piston before reaching top dead center, said groove being placed between 0 and 10 mm. from top dead center of said piston.

4. An improvement as set forth in claim 1 wherein said groove is located in said cylinder wall in a zone opened by said piston during its downward stroke, when the crank shaft coupled to said piston has rotated 0° to 10° from top dead center.

References Cited by the Examiner
FOREIGN PATENTS
194,511    1/1908    Germany.
215,867    5/1924    Great Britain.

SAMUEL LEVINE, Primary Examiner.

FRED E. ENGELTHALER, Examiner.